United States Patent [19]

Barnard

[11] 4,066,961
[45] Jan. 3, 1978

[54] SPEED SENSING

[75] Inventor: Dominic Paul Edmund Barnard, Witney, England

[73] Assignee: Smiths Industries Limited, London, England

[21] Appl. No.: 655,186

[22] Filed: Feb. 4, 1976

[30] Foreign Application Priority Data

Feb. 5, 1975 United Kingdom ............... 4975/75

[51] Int. Cl.² ............................................. G01P 3/46
[52] U.S. Cl. .............................. 324/163; 123/32 EA; 73/204; 73/506; 324/175
[58] Field of Search ............... 324/163, 166, 160, 175; 73/488, 489, 493, 494, 497, 509, 204, 194 VS, 518, 506; 123/32 EA, 32 AE

[56] References Cited

U.S. PATENT DOCUMENTS

| 2,943,614 | 7/1960 | Bosch et al. | 123/32 EA |
| 3,059,480 | 10/1962 | Carpenter | 73/506 |
| 3,312,966 | 4/1967 | Schaller | 73/204 X |
| 3,574,475 | 4/1971 | Wolff | 73/506 X |
| 3,747,577 | 7/1973 | Mauch et al. | 123/32 EA |
| 3,776,208 | 12/1973 | Stumpp | 123/32 EA X |
| 3,796,199 | 3/1974 | Knapp | 123/32 EA |
| 3,797,480 | 3/1974 | Williams | 128/2.08 |
| 3,933,039 | 1/1976 | Mayer | 73/204 |

Primary Examiner—Rudolph V. Rolinec
Assistant Examiner—Vincent J. Sunderdick
Attorney, Agent, or Firm—Pollock, Vande Sande & Priddy

[57] ABSTRACT

Diesel engine speed is sensed by a thermistor which is disposed within an air inlet of the engine manifold so that the resistance of the thermistor varies in accordance with the temperature of the air within the inlet and thus in accordance with the speed of the engine. The thermistor is connected in a transistor circuit which derives, in response to the change in resistance of the thermistor, an electric signal having a frequency which varies in accordance with engine speed.

7 Claims, 4 Drawing Figures

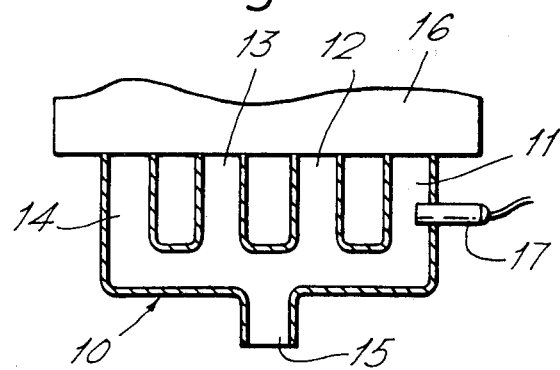
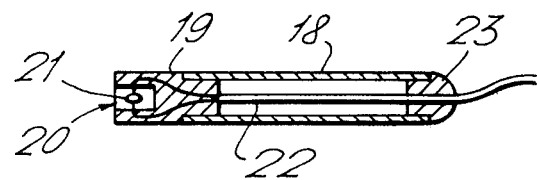
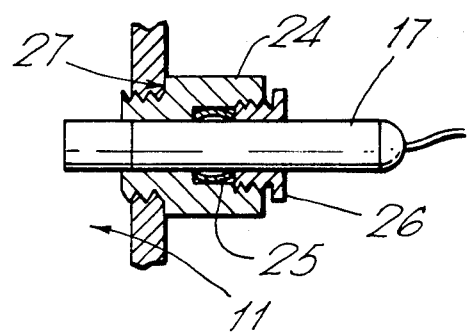

SPEED SENSING

This invention relates to speed sensing and, in particular, to methods of, and apparatus for, sensing diesel engine speed.

According to a first aspect of the present invention there is provided a method of sensing diesel engine speed which involves the step of disposing within an inlet of a diesel engine a device having an electrical characteristic which varies in dependence upon temperature so that the characteristic varies in accordance with the temperature of air within the said inlet and thus in accordance with the speed of the engine.

According to a second aspect of the present invention there is provided speed sensing apparatus for a diesel engine, comprising a temperature-responsive device which has an electrical characteristic that varies in accordance with temperature, and which is to be disposed in an inlet of a diesel engine so that the characteristic varies in accordance with the temperature of air within the said inlet and thus in accordance with the speed of the engine, and an electric circuit including the said device to derive an electric signal indicative of engine speed.

In diesel engines relatively cool air is periodically drawn into the engines through the common manifold inlets, and the individual inlets thereof, at a frequency which varies in accordance with the speed of the engine. It has been found that by disposing within either the common inlet of the engine, or one of its individual inlets, a device having an electrical characteristic that varies in accordance with temperature, the characteristic will vary in accordance with engine speed and thus provide an extremely simple and cheap method of sensing engine speed.

The temperature-responsive device may be one having an impedance which varies in accordance with temperature.

The electric circuit may be arranged to derive an electric signal having a frequency which varies in accordance with engine speed. In such a case, the speed sensing circuit may include pulse generating means responsive to the electric signal to derive a train of pulses having a repetition frequency which varies in accordance with the frequency of the signal.

According to a third aspect of the present invention there is provided a diesel engine including a speed sensing apparatus in accordance with the said second aspect of the invention.

One form of speed sensing apparatus for a diesel engine in accordance with the present invention will now be described, by way of example, with reference to the accompanying drawings in which:

FIG. 1 is a diagram, partly in section, showing a speed sensing probe mounted in the inlet manifold of the engine;

FIG. 2 is a sectional side view showing the probe in more detail;

FIG. 3 is a sectional side view of a device for mounting the probe in the inlet manifold.

Figure 4:
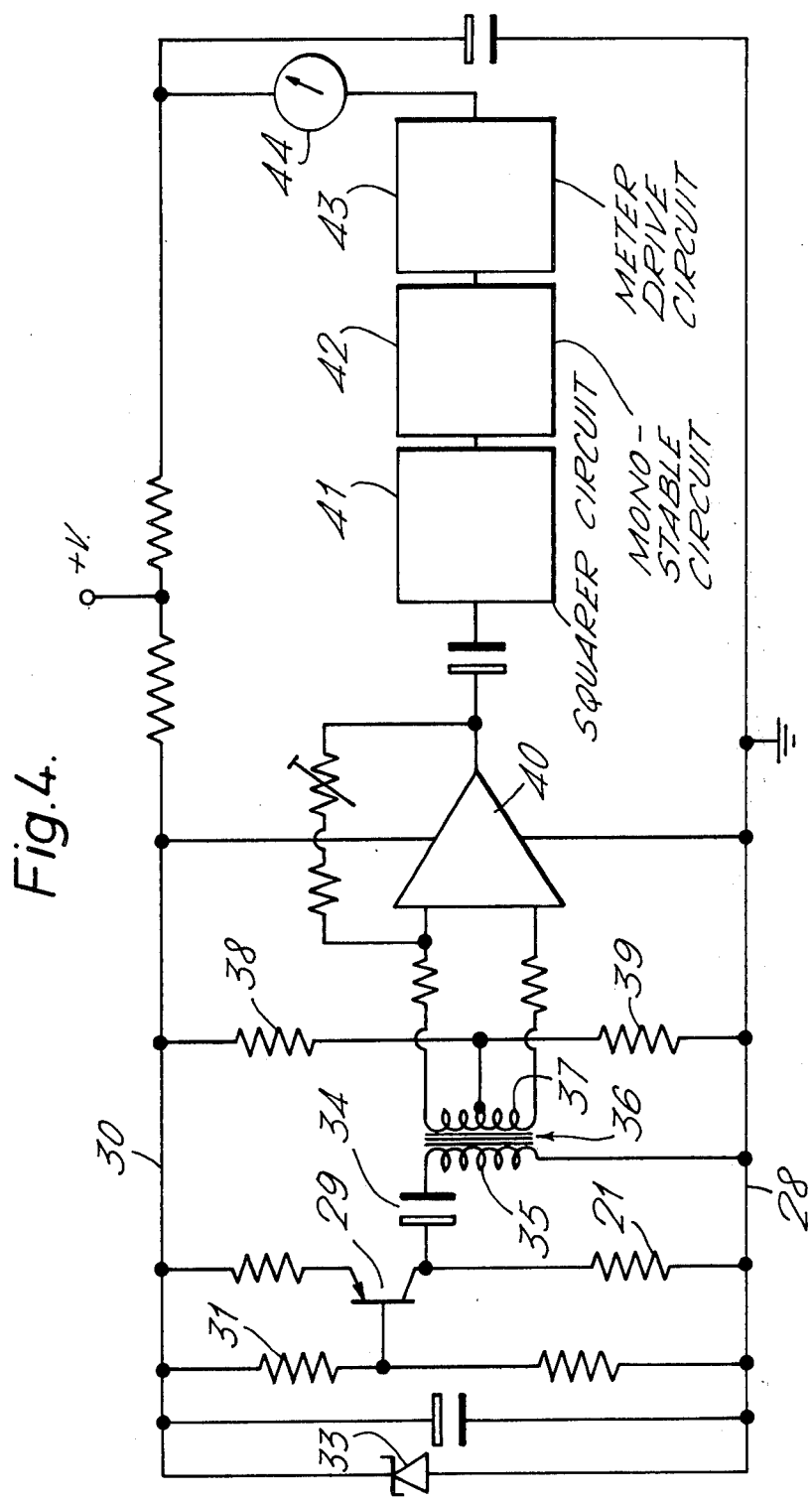
FIG. 4 is a circuit diagram of an electric circuit of the apparatus.

Referring to FIG. 1, a four-stroke diesel engine includes a manifold 10 having four inlets 11 to 14 through which a common inlet 15 of the manifold is coupled to a cylinder head 16. A probe 17 is mounted in the manifold 10 so as to extend into the inlet 11. The end of the probe 17 within the inlet 11 carries a thermistor whose resistance varies in accordance with the temperature of the air within the inlet 11. This air temperature falls rapidly each time air is drawn into the head 16 through the inlet 11 and thereafter gradually increases until air is next drawn into the head. This change in air temperature is sensed by the thermistor whose resistance varies cyclically at a frequency of half the rotational speed of the engine.

The probe 17 is shown in more detail in FIG. 2 and includes a metal tube 18 which is closed at one end by a moulding 19 of plastic shaped to define a channel 20. The thermistor is shown at 21 and is suspended within this channel 20, the terminals of the thermistor being electrically connected to a pair of insulated wires 22 that pass through the moulding 19, along the tube 18 and through a moulding 23 of plastic closing the other end of the tube. The probe 17 is mounted in the manifold 10 by a fixing device (shown in FIG. 3) so that the channel 20 is aligned with the direction of air flow through the inlet 11.

Referring to FIG. 3, the fixing device includes a metal sleeve 24 to receive the probe 17 and has an external threaded portion of reduced diameter at one end which is to engage with a threaded hole in the manifold 10. The sleeve 24 is counterbored at its other end, to house an olive ring 25, and is internally threaded at that end to receive a screw-threaded plug 26. To mount the probe 17 in the manifold 10, the metal sleeve 24 is screwed into the manifold until a shoulder 27 on the sleeve engages the wall of the manifold and the probe 17 is inserted into the inlet 11 through the sleeve to position the thermistor 21 at the desired position within the inlet 11. The plug 26 is then scrwed into the sleeve 24 to deform the olive ring 25 and cause the edges of this ring to bite into the surface of the metal tube 18.

Referring to FIG. 4, the thermistor 21 has a negative temperature coefficient and is connected between an earthed line 28 and the collector electrode of a transistor 29 whose emitter electrode is connected to a positive voltage supply line 30 and whose base electrode is connected to the junction of resistors 31 and 32 serially connected between the lines 28 and 30. The voltage on the line 30 is stablised by a zener diode 33.

When air is drawn into the cylinder head 16 through the inlet 11, the rapid decrease in the air temperature in that inlet causes a corresponding rapid increase in the resistance of the thermistor 21. This increases the voltage drop across the thermistor 21 and thereby causes the voltage at the collector electrode to increase positively. Thereafter the air temperature gradually increases until air is next drawn into the head 16 through the inlet 11 and during that intervening period the resistance of the thermistor 21 gradually decreases to cause the voltage drop across the thermistor to decrease and thereby decrease the voltage at the collector electrode. When air is next drawn into the inlet 11, the resistance of the thermistor 21 rapidly increases to cause a corresponding increase in the collector voltage. Thus the voltage at the collector electrode varies cyclically in accordance with the air temperature in the inlet 11 and thus at a frequency equal to half the engine speed.

This cyclically-varying signal is supplied via a capacitor 34 to one end of the primary winding 35 of the transformer 36. This transformer 36 has a center-tapped secondary winding 37 whose tap is connected to the junction of a pair of resistors 38 and 39 serially connected between the lines 28 and 30. The ends of the secondary winding 37 are connected to respective inputs of a differential amplifier 40 to provide at these two inputs respective cyclically-varying signals of the same frequency as the signal at the collector electrode of the transistor and of opposite phase to one another. The amplifier 40 alternately saturates in opposite senses to provide a square waveform signal having a frequency equal to the frequency of the cyclically-varying signal. This square waveform signal is supplied to a squarer circuit 41 which responds to this signal and supplies to a monostable circuit 42 a train of sharp-edged pulses having a repetition frequency equal to the frequency of the output signal of the amplifier 40. The operation of the monostable circuit 42 is initiated by each of the squared pulses and supplies, for each squared pulse, a pulse of predetermined width to a meter drive circuit 43. This circuit 43 provides current pulses to a current meter 44, acting as an integrator, which displays the average value of the current pulses with respect to time on a scale calibrated in revolutions per minute.

The squarer circuit 41, the monostable circuit 42 and the meter drive circuit 43 may be of the kind shown in FIG. 3a, FIG. 4 and FIG. 5, respectively, of U.K. patent specification No. 1,326,002.

It has been found that variations in the ambient temperature conditions of the engine may cause drift in the output signal of the transistor 29 and resultant errors in the speed measurement. By using a differential amplifier rather than a conventional single-input amplifier to amplify the output signal of the transistor 29 such errors may be eliminated.

It is visualised that the transistor could be mounted in the common inlet 15 of the engine. In these circumstances the frequency of the output signal of the transistor 29 would be twice, rather than half, the engine speed.

I claim:

1. Speed sensing apparatus for a diesel engine in which air is intermittently drawn into a combustion chamber through a hot inlet of the engine, the air being warmed by the hot inlet comprising,
   a temperature-responsive device which has an electrical characteristic that varies in accordance with the temperature of the air in said hot inlet
   means supporting said device in said inlet of the diesel engne,
   said device being of the kind which has a response time to temperature variations permitting its said electrical characteristic to vary in accordance with the cyclical variations in the temperature of the air in said hot inlet occurring upon each revolution of the engine,
   and means responsive to said variation of said electrical characteristic of said device for deriving a signal indicative of engine speed.

2. Speed sensing apparatus according to claim 1, wherein the device has an impedance which varies in accordance with temperature.

3. Speed sensing apparatus according to claim 1, wherein said signal is an electric signal having a frequency which varies in accordance with engine speed.

4. Speed sensing apparatus according to claim 3, including pulse generating means responsive to the electric signal to derive a train of pulses having a repetition frequency which varies in accordance with the frequency of the signal.

5. A method of sensing speed of a diesel engine in which air is intermittently drawn into a combustion chamber through a hot inlet of the diesel engine, the air being heated by said hot inlet, which involves the steps of:
   disposing within said inlet of the diesel engine a device having an electrical characteristic that varies in accordance with cyclical temperature fluctuations of air within the said inlet as air is intermittently drawn therein and heated by said hot inlet and thus in accordance with the speed of the diesel engine,
   and sensing the frequency of said variation of the electrical characteristic to provide an indication of the speed of the engine.

6. A method of sensing diesel engine speed in which air is intermittently drawn into a combustion chamber through a hot inlet of the engine and is heated by said inlet comprising the steps of:
   generating a signal responsive to the cyclical fluctuations in the temperature of the air within an inlet of the diesel engine as air is intermittently drawn therein,
   and responding to the frequency characteristic of the generated signal to provide a measure of engine speed.

7. The method of claim 6 wherein said signal which is generated is an electric signal.

* * * * *